United States Patent Office 2,783,394
Patented Feb. 26, 1957

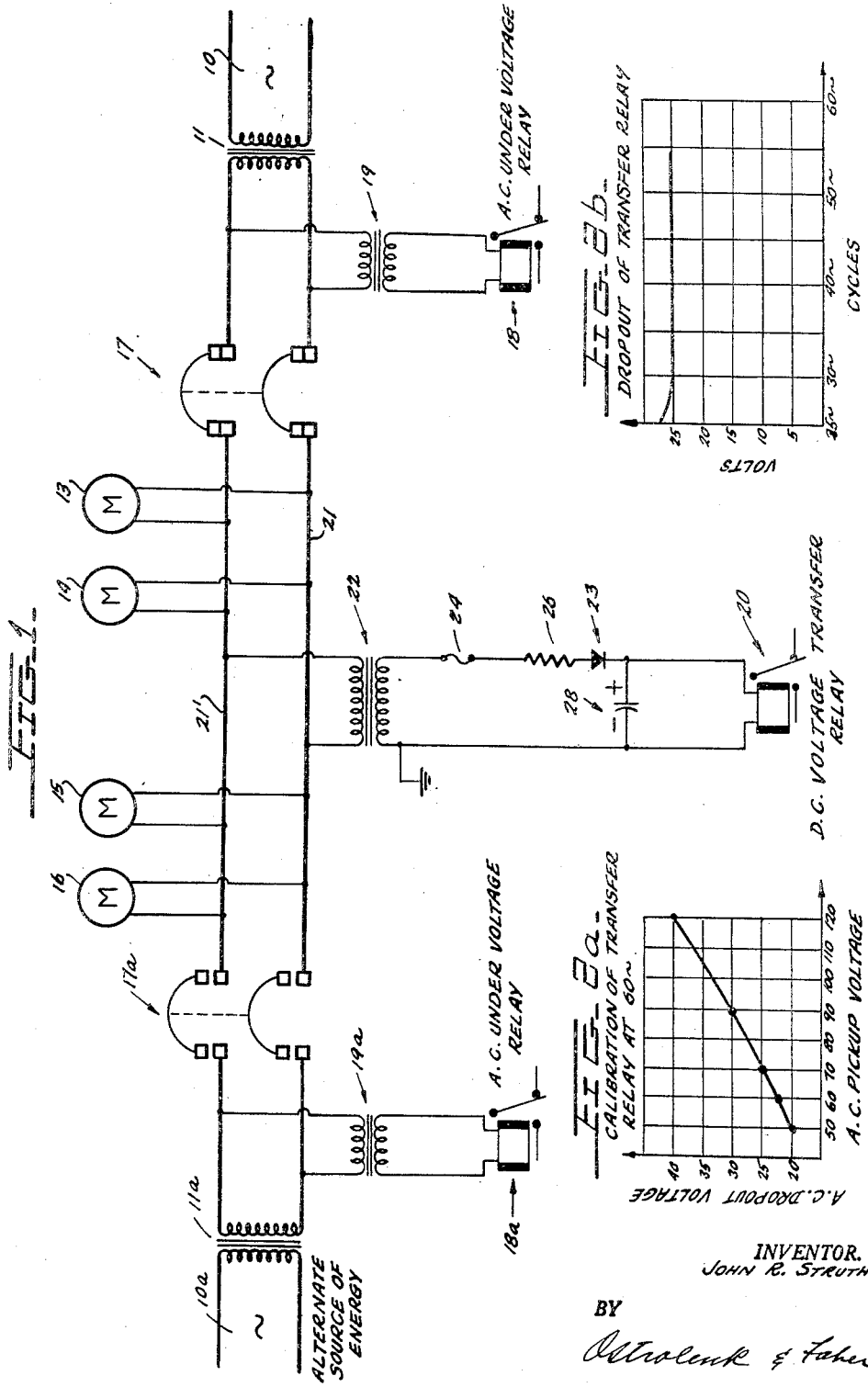

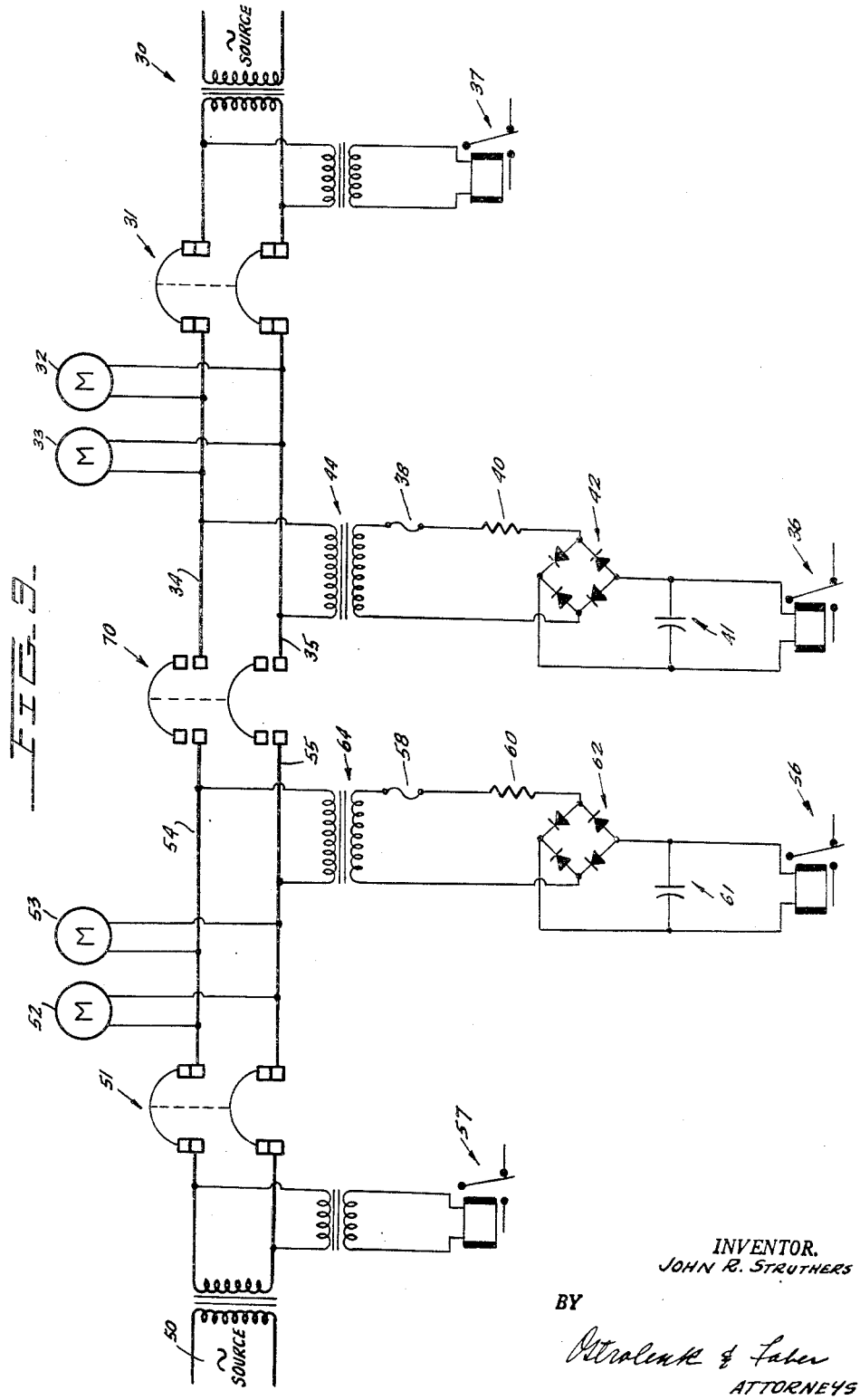

2,783,394

NON-FREQUENCY RESPONSIVE A.-C. VOLTAGE RELAY FOR DISTRIBUTION SYSTEMS

John R. Struthers, Havertown, Pa., assignor to I-T-E Circuit Breaker Company, Philadelphia, Pa., a corporation of Pennsylvania Application April 16, 1954, Serial No. 423,619

6 Claims. (Cl. 307—64)

My invention relates to an electrical distribution system and is more particularly directed to a non-frequency responsive relay to measure transient residual voltage of disconnected electrical motors during automatic bus transfer.

In a transfer system where an alternate source must be switched in upon a drop in line voltage or in a system where a tie breaker must be closed upon a loss in voltage of one of two sources, it is necessary to prevent the automatic closing of the circuit breaker which connects the alternate source during the transfer operation, until the decreasing voltage feed back of a motor load has decreased below at least 25% of normal line voltage.

That is, it is necessary to prevent the automatic switching until a pre-determined drop in voltage, in order to avoid out-of-phase switching of electrical energy. However, as soon as the under-voltage relay drops-out and thereby tripping the circuit breaker for the main source, the motor load will supply feed-back electrical energy to the disconnected bus. That is the motor loads will act as generators due to their momentum.

However, since the motor loads are constantly decelerating when their source of energy is removed, both their output voltage and frequency will constantly decrease. Thus for example, the frequency of the feed back voltage may drop from 60 cycles to 20 cycles.

The typical sub-station installation utilizing an alternating current transfer relay on a line having a normal voltage of 480 volts, the transfer relay is designed to drop out when the voltage drops to between 100 and 140 volts. A potential transformer is used to step down the voltage to the transfer relay so that the transfer relay actually drops out between 25 and 35 volts, which represents a drop to between 100 and 140 volts on the bus.

The transfer relay is calibrated for pick-up and drop out with 60 cycle current. However, with a motor load, when the voltage drops to between 100 and 140 volts the frequency of the current will decrease from 60 cycles to less than 45 cycles.

Since the alternating current transfer relay is sensitive to both the independent variables of voltage lead frequency there will be no definite point of operation, in view of the constantly decreasing frequency. That is, the transfer relay operation will not be predictable since it is calibrated at 60 cycles whereas, in fact, the motor load will cause the constantly decreasing feed back voltage to have a constantly decreasing frequency.

The alternate voltage source may be connected to the load before the line voltage has decreased to below 25% of the normal line voltage, and hence may result in out-of-phase switching of electrical energy.

My instant invention provides a novel circuit wherein the transfer relay is rendered non-responsive to frequency variations so that it will drop out at a predetermined voltage regardless of frequency variations. With my novel arrangement the transfer relay can be calibrated for operation within a 5% variation in the voltage over a frequency range of 60–20 cycles.

My invention utilized a D.-C. voltage transfer relay which is operated from a dry rectifier energized from a potential transformer connected to the bus so that it is non-responsive to the feed back frequency.

Accordingly, a primary operation of my invention is to provide a novel switching system for an alternating current line wherein the transfer relay is non-responsive to frequency variations of the feed back voltage.

Another object of my invention is to provide a novel double-ended unit, wherein an alternate source of energy may be substituted for a normal source of energy without the possibility of out-of-phase switching.

A still further object of my invention is to provide a direct current transfer relay for an alternating current system wherein rectifier means enables the relay to be responsive to voltage variations only and to be non-responsive to frequency variations.

These and other objects of my invention will be apparent from the following description when taken in connection with the drawings in which:

Figure 1 is a circuit diagram for a double-ended sub-station. This figure shows the normal source of energy available, to be switched into the circuit when the voltage from the normal source of energy drops below a predetermined value. This figure also illustrates the circuitry by which the transfer relay is rendered responsive to the voltage on the line and non-responsive to the frequency.

Figure 2 is a graphic illustration showing the characteristic curve for a transfer relay of alternating current drop out voltage versus alternating current pick up voltage.

Figure 2b is a calibration curve for a transfer relay and illustrates that the relay will drop out at a predetermined voltage value regardless of the frequency magnitude.

Figure 3 is a circuit diagram of a sub-station installation and illustrates transfer relay circuits associated with each source. This circuit permits the transfer relay to close the tie circuit breaker when its associated source and load drops below a predetermined voltage value.

Referring now to Figure 1, I have shown a normal source of alternating current energy which supplys 480 volts to the line, to the transformer 11a. An alternate alternating current source 10a is connected to the line through the transformer 11a. The normal source of energy is connected to the motor loads 13, 14, 15, 16 through the circuit breaker 17 which is closed during normal operation.

The circuit breaker 17a is open during normal operation so that the alternate alternating current source of energy 10a does not supply energy to the motor loads 13, 14, 15, 16.

An under voltage alternating current relay 18 and 18a is associated respectively with the normal source of energy 10 and the alternate source of energy 10a. The under voltage relay operates in the manner described in co-pending application Serial No. 378,026, filed September 2, 1953 (C-270) assigned to the assignee of the instant application.

Thus, for example, when the system is operating as illustrated in Figure 1, a drop in voltage of the normal source of energy 10 to a predetermined value will result in the dropping out of the under voltage relay to thereby open the circuit breaker 17.

A potential transformer 19 and 19a is provided for each of the under voltage relays 18 and 18a to step down the line voltage from 480 volts to approximately 120 volts. After the under voltage relay 18 has dropped out thereby opening the circuit breaker 17 there will be no source of energy supplying the motor loads 13, 14, 15, 16.

The transfer relay 20 will close the circuit breaker 17a when the voltage on the line for the loads 13, 14, 15, 16 drops below a predetermined value, for example, 25% of normal line voltage.

The circuitry controlled by the transfer relay and the mechanisms through which the circuitry is operative to close the circuit breaker 17a is shown respectively in co-pending applications Serial No. 378,026, filed September 2, 1953 (C–270) and Serial No. 254,349, filed November 1, 1951 (C–202) assigned to the assignee of the instant application.

During the period of time that the under voltage relay 18 drops out and the drop out of the transfer relay, which is calibrated for a voltage which is lower than the drop out voltage for the under voltage relay 18, the motor loads 13, 14, 15, 16 will supply a feed back voltage to the system. That is the momentum of the motors will cause them to operate as generators thereby feeding a voltage back to the system.

Hence, it is necessary to prevent the switching of the alternate source of energy 10a through the circuit breaker 17a until the feed back voltage has dropped below a predetermined value as, for example, between 100 and 140 volts. That is, in order to prevent out-of-phase switching of the alternate source of energy 10a, it is essential to prevent the operation of the transfer relay 20 until this predetermined low voltage magnitude exists on the line. However, the transfer relay 20 is calibrated at 60 cycles to drop out at a predetermined voltage as, for example, 100 volts on the line or 25 volts on the secondary of the potential transformer 22, to which transfer relay is connected.

Since the feed back voltage on the line 21—21' is being supplied from the constantly decelerating motor loads 13, 14, 15, 16 the frequency will also be constantly decreasing. Hence, if the transfer relay is an alternating current device, which would be responsive to both the independent variables of voltage and frequency, it would drop out at a value above 25% of the normal line voltage, if there is a substantial decrease in the frequency at that voltage. That is, since the feed back frequencies are undetermined values it is not possible to calibrate the transfer relay to drop out at a predetermined voltage at the frequency which will exist at that voltage.

Furthermore, it is necessary to calibrate this device to pick up, at a predetermined voltage, at 60 cycles. Hence, in the prior art arrangement the operation of the transfer relay is not determinable, thereby resulting in out-of-phase switching. In order to prevent this undesirable result I have provided a circuit arrangement wherein the transfer relay is rendered non-responsive to frequency variations of the feed back voltage, so that it will drop out at a predetermined voltage within 5% variation of frequency.

The circuit for achieving this is as follows: a potential transformer 22, which steps down the voltage of the line in a 4:1 ratio, is connected to the transfer relay 20 through a dry rectifier 23. A series connected fuse 24 is inserted in series with the secondary transformer 22 and a dry rectifier 23. A limiter resistor 26 is inserted in series with the rectifier 23 to compensate for in-rush currents.

I have illustrated the circuitry of Figure 1 with typical examples of voltage and current magnitudes. For the magnitudes illustrated the resistor 26 has twenty-seven ohms of resistance to limit the in-rush currents. The dry rectifier 23 has a capacity to permit current flow of 200 mills therethrough.

A 40 mfd. capacitor 28 is connected in parallel with the transfer relay 20. Capacitor 28 will increase the voltage across the transfer relay in order to obtain a desirable ratio of drop out voltage to pick up voltage.

A typical calibration for a transfer relay such as 20 is illustrated in Figure 2a. Thus, for example, at 60 cycles it may be calibrated to drop out when the voltage on the secondary of the potential transformer 22 is 25 volts and will pick up when the voltage on the secondary of this transformer is at 70 volts. Translating these voltage magnitudes to the voltage which exists on the line 21—21', when the transfer relay 20 is calibrated to drop out at 100 volts, it will pick up when the line voltage is 280 volts.

By using the circuitry shown in Figure 1, in which the A.-C. voltage on the secondary of the potential transformer 22 is converted to D.-C. current voltage through the rectifier 23, increased by the capacitor 28, the transfer relay 20 will be energized solely by D.-C. voltage.

Thus the transfer relay 20 will be responsive only to the voltage and will be non-responsive to frequency variations which may exist on the line 21—21' due to the feed back voltage of the motor loads 13, 14, 15, 16. The drop out curve in Figure 2b illustrates this non-responsive feature of the transfer relay 20. Thus as heretofore noted the transfer relay 20 may be calibrated at 60 cycles to drop out at 25 volts on the secondary to the potential transformer 22.

Figure 2b illustrates the drop out voltage for the transfer relay 20 which is calibrated as noted above. This figure illustrates that the transfer relay 20 will continue to drop out at approximately 25 volts where frequency ranges between 25 and 60 cycles. Thus I have provided a novel circuit in which the alternate source of energy 10a will not be switched in to the motor loads 13, 14, 15, 16 through the circuit breaker 17a until the feed back voltage from the motor loads has dropped to a predetermined value. That is if the normal source of energy 10 should drop below a predetermined value resulting in the drop out in the under voltage relay 18, which opens the circuit breaker 17, the transfer relay will not switch in the alternate source 10a through circuit breaker 17a until the feed back voltage has decreased to a predetermined value, regardless of the frequency magnitude at that time. Thus the inherent design of my novel transfer system will prevent out-of-phase switching.

As fully described above the transfer relay 20 will drop out when the line voltage decreases to a predetermined voltage as, for example, 25% of the line voltage. However, since it is operated to subsequently close the circuit breaker 17a to thereby connect the source the source 10a to the loads 13, 14, 15, 16, the voltage on the potential transformer 22 will increase after the transfer operation has been completed. As noted in Figure 2a, the transfer relay will pick up at a fixed voltage depending upon its fixed drop out value. Hence, after the transfer operation has been completed the transfer relay 20 will again be energized to thereby bring all of the components to their normal position.

In the arrangement of Figure 3 the source 30 supplies electrical energy to the motor loads 32, 33 through the normally closed circuit breaker 31 and a second source 50 supplies electrical energy to the motor loads 52, 53 through the normally closed circuit breaker 51. The tie circuit breaker 70 is open during normal operation of the sub-station circuitry.

A transfer relay 36 is associated with the lines 34—35 and a transfer relay 56 is associated with the lines 54—55. The under voltage relays 37 and 57, similar to under voltage relays 18 and 18a of Figure 1, operated in the manner disclosed in co-pending applications Serial No. 378,026, filed September 2, 1953 (C–270) and Serial No. 254,349, filed November 1, 1951 (C–202).

That is, if the voltage of those respective sources should drop below a first predetermined value, the voltage relay will drop out and thereby open its associated circuit breaker. Under voltage relay 37 will open circuit breaker 31 when the voltage of source 30 drops below predetermined value and under voltage relay 57 will open its associated circuit breaker 51 when its source 50 drops below predetermined value.

The circuitry for energizing the transfer relays 36 and 56 are provided with a fuse 38, 58 a limiting resistor 40, 60 and a capacitor 41, 61 to increase the voltage across the relays, which are substantially the same as described in connection with Figure 1. However, in the embodiment of Figure 3 the rectifier 23 for the transfer relay is replaced by a bridge type rectifier 42, 62. The circuit of Figure 3 operates in substantially the same manner as in Figure 1. That is, A.-C. voltage on the potential transformer 44, 64 and the bridge type rectifier 42, 62 will convert the A.-C. to D.-C. so that the transfer relays 36, 56 will be non-responsive to frequency variations in the lines 34—35, 54—55, respectively.

The circuitry of Figure 3 operates as follows: during normal conditions the first alternating current source 30 supplies the loads 32, 33 and the second alternating current source 50 supplies the loads 52, 53 with the tie circuit breaker 70 open between the lines 34—35 and 54—55. If the line voltage from the source 50 should drop below a predetermined value the under voltage relay 57 will drop out thereby opening its associated circuit breaker 51.

Following this operation there will be no source of energy for the motor loads 52, 53. However, due to the momentum of the loads, motor loads 52 and 53 will act as generators to feed back voltage into line 54—55. Although these units are constantly decelerating, the frequency output thereof is also constantly decreasing, the transfer relay 56 will not be responsive to this drop in frequency.

However, the transfer relay 56 will be responsive to the drop in voltage and after it has reached a predetermined low value as, for example, 25% of normal line voltage, the transfer relay will drop out to thereby close the tie circuit breaker 70. The circuitry controlled by the transfer relay 56 and a closing mechanism for the circuit breaker operates in the manner disclosed in copending applications Serial No. 378,026, filed September 2, 1953 (C–270) and Serial No. 254,349, filed November 1, 1951 (C–202).

When the tie circuit breaker is closed the source 30 will then supply energy to both the loads 32, 33 and 52, 53 through the tie circuit breaker 70 and the lines 54–55. It will be noted that since the transfer relay 56 is non-responsive to frequency variations it can be calibrated to drop out within 5% of a predetermined value of load voltage to thereby prevent out-of-phase switching.

After the switching operation has been completed, normal line voltage will be restored to the lines 54—55 from the source 30 so that the transfer relay 56 will again pick up to restore the components to their normal position.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a double-ended unit sub-station comprised of a normal alternating current source of energy, an alternate alternating current source of energy, and a transfer relay; a circuit breaker and an under-voltage relay associated with each of said sources; said normal source under-voltage relay operative to open said normal source circuit breaker when said normal source voltage decreases below a predetermined voltage, said transfer relay operative to close said alternate source circuit breaker when the load voltage decreases below a predetermined value, potential transformer connected to the line being supplied by said source; and a rectifier connected between the secondary winding of said transformer and said transfer relay to render said relay non-responsive to frequency variations in the feed back voltage.

2. In a double-ended unit sub-station comprised of a normal alternating current source of energy, an alternate alternating current source of energy, and a transfer relay; a circuit breaker and an under-voltage relay associated with each of said sources; said under-voltage relay operative to open said normal source circuit breaker when said normal source decreases below a predetermined voltage, said transfer relay operative to close said alternate source circuit breaker when the load voltage decreases below a predetermined value; and a rectifier connected between said relay and the load supplied by said source to convert alternating voltage to direct voltage and thereby prevent out-of-phase switching to said alternate source of energy.

3. In a sub-station comprised of a first A.-C. source of energy, a second A.-C. source of energy, and a transfer relay; a circuit breaker and an under-voltage relay associated with each of said sources; said under-voltage relay operative to open said first source circuit breaker when said first source decreases below a predetermined voltage, said transfer relay operative to close said second source circuit breaker when the load voltage decreases below a predetermined value, a circuit between said transfer relay and the load being supplied by said source, said circuit being comprised of a rectifier and capacitor connected in parallel therewith, said capacitor increasing the voltage on said transfer relay.

4. An electrical system comprised of a first and second alternating current source, a first and second circuit breaker, a first and second under-voltage relay, a first and second transfer relay and a tie circuit breaker; said first and second source, circuit breaker, under-voltage relay and transfer relay connected on opposite sides, respectively, of said tie circuit breaker; said under-voltage relay effective to open its associated circuit breaker when the voltage from its associated source drops below a predetermined minimum; said transfer relay effective to close said tie breaker when the feed back voltage drops below a predetermined value; and a rectifier connected in series with said transfer relay to render said relay non-responsive to frequency decrease from the feed back voltage of the system to thereby prevent out-of-phase switching.

5. In an electric system for selectively connecting a first and second source of alternating current energy to a load; a first and second circuit protective device associated respectively with said first and second source of alternating current energy; each of said first and second circuit protective devices having means responsive to undervoltage condition of said source associated therewith; said means operatively connected to effect disengagement of its said associated circuit protective device when its associated source has an output voltage which decreases below a predetermined value; said first and second alternating current source operatively connected to energize the load when their said associated circuit protective device is closed; a transfer relay operative to effect connection of one of said sources to said load when the voltage of the other of said sources drops below a predetermined value; said transfer relay electrically coupled and connected to circuit between said source and said load by a transformer; rectifier means connected in the circuit between said transformer and said transfer relay to render said relay non-responsive to frequency variations of the feed back voltage from the load and thereby prevent out-of-phase switching between said first and second source of alternating current energy.

6. In an electrical system for selectively connecting a first or second alternating current energy to a load comprising a circuit protective device, a transformer, and a D.-C. transfer relay; said circuit protective device having an engaged and disengaged position and being operatively connected in a circuit between a first source of energy and a load; said circuit protective device having an undervoltage means operatively connected to effect disengagement of said circuit protective device when the first source of alternating current energy has an output voltage below a predetermined value; said D.-C. transfer relay operative to effect electrical connection of the second source of energy to a load when said circuit protective device is in said disengaged position; said D.-C. transfer relay electrically coupled to the circuit between the first source of energy and the load by means of said transformer; rectifier means connected in the circuit between said transformer and said D.-C. transfer relay to render said transfer relay non-responsive to frequency variations in the feed back voltage from said load when said circuit protective device is disengaged to thereby prevent out-of-phase switching to said load from the first source of energy to the second source of energy.

References Cited in the file of this patent
UNITED STATES PATENTS

| | | |
|---|---|---|
| 1,662,366 | Cosgray | Mar. 13, 1928 |
| 1,786,310 | McCullough | Dec. 23, 1930 |